(12) United States Patent
Ootaka et al.

(10) Patent No.: US 11,287,519 B2
(45) Date of Patent: Mar. 29, 2022

(54) DISTANCE MEASUREMENT SYSTEM, DISTANCE MEASUREMENT DEVICE, AND DISTANCE MEASUREMENT METHOD

(71) Applicants: Kabushiki Kaisha Toshiba, Tokyo (JP); Toshiba Electronic Devices & Storage Corporation, Tokyo (JP)

(72) Inventors: Shoji Ootaka, Kanagawa (JP); Masaki Nishikawa, Kanagawa (JP); Takayuki Kato, Kanagawa (JP); Katsuya Nonin, Kanagawa (JP); Yoshiharu Nito, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 274 days.

(21) Appl. No.: 16/573,532

(22) Filed: Sep. 17, 2019

(65) Prior Publication Data
US 2020/0088863 A1 Mar. 19, 2020

(30) Foreign Application Priority Data
Sep. 19, 2018 (JP) .............................. JP2018-175377

(51) Int. Cl.
*G01S 11/02* (2010.01)
*G01S 13/84* (2006.01)
(Continued)

(52) U.S. Cl.
CPC ............... *G01S 11/02* (2013.01); *G01S 7/023* (2013.01); *G01S 13/84* (2013.01); *G07C 9/00174* (2013.01)

(58) Field of Classification Search
CPC .................................. G01S 11/02; G01S 13/84
(Continued)

(56) References Cited

U.S. PATENT DOCUMENTS

| 5,220,332 A | 6/1993 | Beckner et al. |
| 2018/0267154 A1 | 9/2018 | Ootaka et al. |
| 2019/0005753 A1* | 1/2019 | Leconte ................. B60R 25/245 |

FOREIGN PATENT DOCUMENTS

| JP | 2001033547 A | 2/2001 |
| JP | 2008-20221 A | 1/2008 |

(Continued)

*Primary Examiner* — Bo Fan
(74) *Attorney, Agent, or Firm* — Allen & Overy LLP

(57) ABSTRACT

A distance measurement system for transmitting and receiving a distance measurement signal including a phase detection signal between first and second devices and calculating a distance between the devices based on a phase detection result of the received phase detection signal includes a modulation circuit configured to generate the distance measurement signal including a modulated signal obtained by modulating an identification signal, a transmission circuit configured to transmit the distance measurement signal, a reception circuit configured to receive the distance measurement signal, a demodulation circuit configured to demodulate the modulated signal in the received distance measurement signal, and a control circuit configured to judge a restored state of the identification signal obtained from a demodulation result of the demodulation circuit.

17 Claims, 12 Drawing Sheets

(51) Int. Cl.
*G01S 7/02* (2006.01)
*G07C 9/00* (2020.01)

(58) Field of Classification Search
USPC .......................................... 342/458, 457, 423
See application file for complete search history.

(56) References Cited

FOREIGN PATENT DOCUMENTS

| | | |
|---|---|---|
| JP | 2009-103566 A | 5/2009 |
| JP | 2019-502096 A | 1/2019 |
| WO | 2011-062098 A1 | 5/2011 |

* cited by examiner

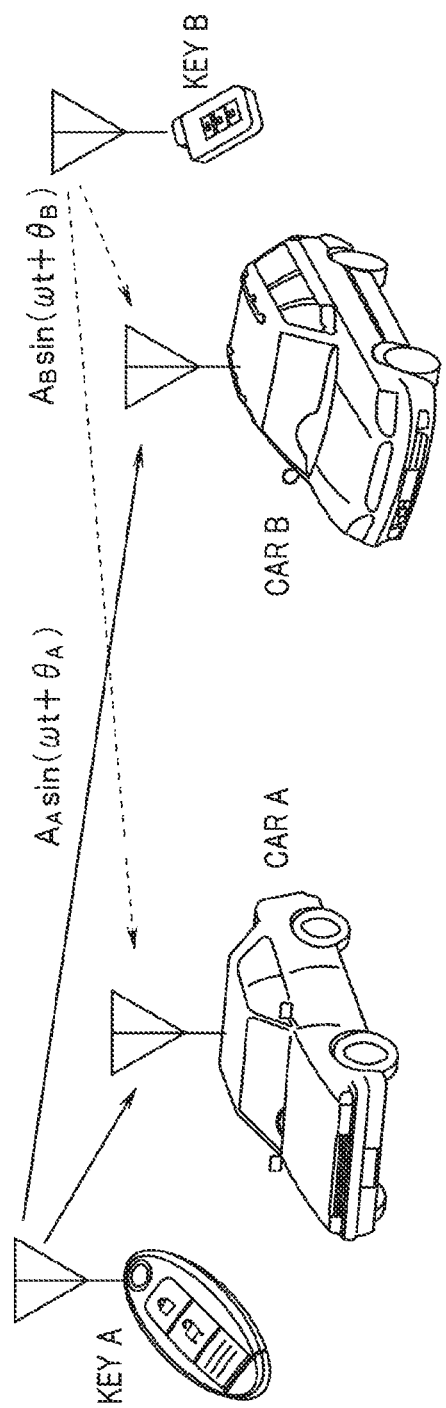

DISTANCE MEASUREMENT SYSTEM, DISTANCE MEASUREMENT DEVICE, AND DISTANCE MEASUREMENT METHOD

CROSS-REFERENCE TO RELATED APPLICATION

This application is based upon and claims the benefit of priority from the prior Japanese Patent Application No. 2018-175377 filed in Japan on Sep. 19, 2018; the entire contents of which are incorporated herein by reference.

FIELD

The present invention herein relates generally to a distance measurement system, a distance measurement device, and a distance measurement method.

BACKGROUND

In recent years, a keyless entry for easily locking and unlocking a vehicle has been adopted in many vehicles. Such a technique is for locking and unlocking a door using communication between a key of an automobile and the automobile. Further, in recent years, a smart key system capable of locking and unlocking a door lock and starting an engine without touching a key has also been adopted.

However, a case where an attacker enters the communication between a key and an automobile and steals the automobile has frequently occurred. As a defensive measure against an attack (so-called a relay attack), a countermeasure for inhibiting a control of an automobile by communication when it is judged that the distance between the key and the automobile is a predetermined value or more has been discussed.

Examples of such a system for performing distance measurement include a communication type distance measurement system for finding the distance between devices by communication by adopting a phase detection method.

However, if a plurality of distance measurement systems exist in the neighborhood, the distance measurement systems may be affected by an interference wave in the same frequency band so that a detected phase may change by the interference wave, resulting in a decreased distance measurement accuracy.

BRIEF DESCRIPTION OF THE DRAWINGS

FIG. 2 is a diagram for describing a decrease in a distance measurement accuracy when an interference wave exists;

DETAILED DESCRIPTION

According to an aspect of the present embodiment, there is provided a distance measurement system for transmitting and receiving a distance measurement signal including a phase detection signal between first and second devices and calculating a distance between the devices based on a phase detection result of the received phase detection signal, the distance measurement system including a modulation circuit configured to generate the distance measurement signal including a modulated signal obtained by modulating an identification signal, a transmission circuit configured to transmit the distance measurement signal, a reception circuit configured to receive the distance measurement signal, a demodulation circuit configured to demodulate the modulated signal in the received distance measurement signal, and a control circuit configured to judge a restored state of the identification signal obtained from a demodulation result of the demodulation circuit.

Embodiments of the present invention will be described in detail below with reference to the drawings.

First Embodiment

Figure 1:
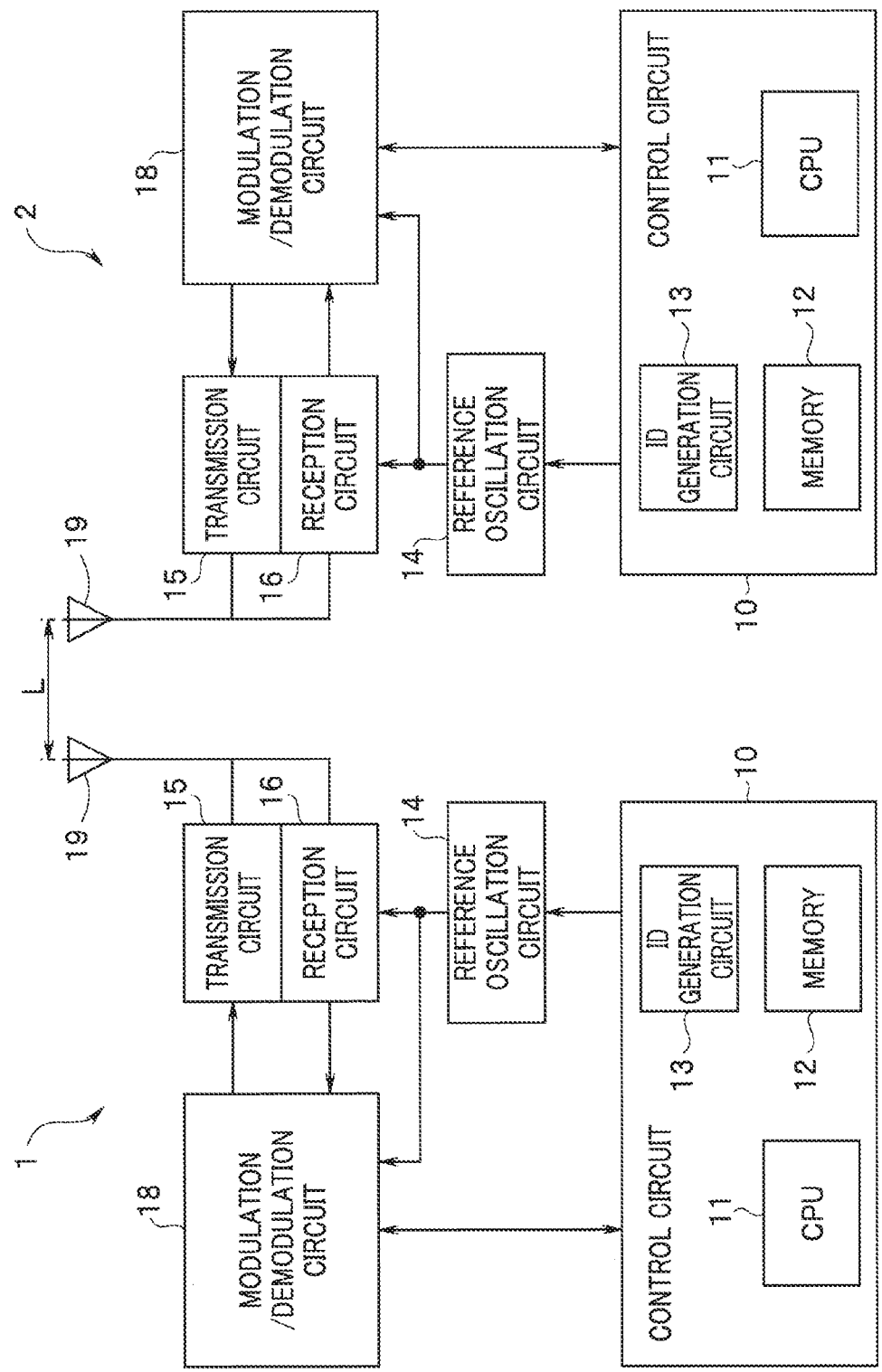
FIG. 1 is a block diagram illustrating a distance measurement system adopting a distance measurement device according to a first embodiment of the present invention.

FIG. 1 is a block diagram illustrating a distance measurement system adopting a distance measurement device according to a first embodiment of the present invention.

In the present embodiment, an example in which a phase detection method using an unmodulated carrier is adopted and communication type distance measurement for finding a distance between devices by communication is adopted will be described. In the distance measurement device, if a distance measurement signal is affected by an interference wave, it can conceivably be effective to discard the affected distance measurement signal and newly transmit and receive a distance measurement signal. Accordingly, an influence of the interference wave is desirably made detectable.

In the present embodiment, presence or absence of an interference wave is judged using ID (identification) information for identifying a device, for example, to realize distance measurement using only an effective distance measurement signal. As a result, even in an environment in which the interference wave occurs, a distance measurement accuracy is prevented from decreasing.

First, referring to FIGS. 2, 3A, and 3B, the decrease in the distance measurement accuracy when the interference wave exists will be described.

FIG. 2 illustrates a situation where a plurality of distance measurement systems simultaneously exist. For example, it is assumed that two cars, i.e., a car A and a car B are parked in a parking lot or the like and both the car A and the car B adopt a smart key system. A smart key corresponding to the car A is a key A, and a smart key corresponding to the car B is a key B. Between the car A and the key A and between the car B and the key B, a distance measurement system for preventing a relay attack by finding the respective distances is adopted when the smart key system is operated.

The car A issues to the key A a request to judge whether or not a keyless entry is to be made. The key A returns a response when receiving the request from the car A, to start communication for distance measurement before being unlocked. If the distance measurement system is a communication type distance measurement using a phase detection method, an unmodulated distance measurement signal is alternately transmitted and received between the car A and the key A. Communication is also performed between the car B and the key B.

For example, it is assumed that an unmodulated distance measurement signal is transmitted from the key B to the car B substantially at the same time that an unmodulated distance measurement signal is transmitted from the key A to the ear A. In this case, the car A may receive not only the distance measurement signal from the key A but also the distance measurement signal from the key B. The car B may receive not only the distance measurement signal from the key B but also the distance measurement signal from the key A.

When both of the distance measurement systems perform distance measurement using distance measurement signals in the same frequency band, a receiver for distance measurement in the car A performs distance measurement using respective phase information obtained from the distance measurement signals from the key A and the key B so that correct distance measurement cannot be performed. The same applies to the car B.

Figure 3A:
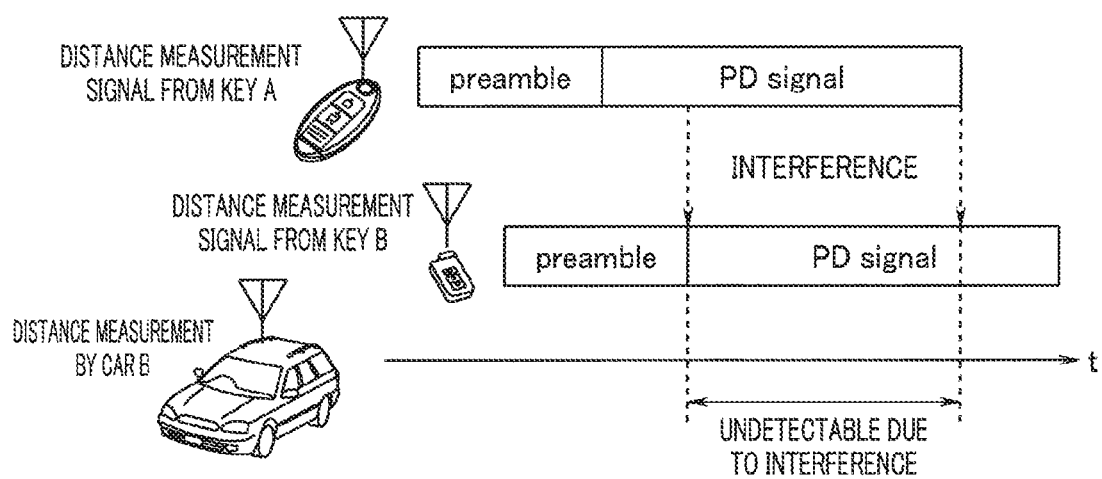
FIG. 3A is a diagram for describing a decrease in a distance measurement accuracy when an interference wave exists.
Figure 3B:
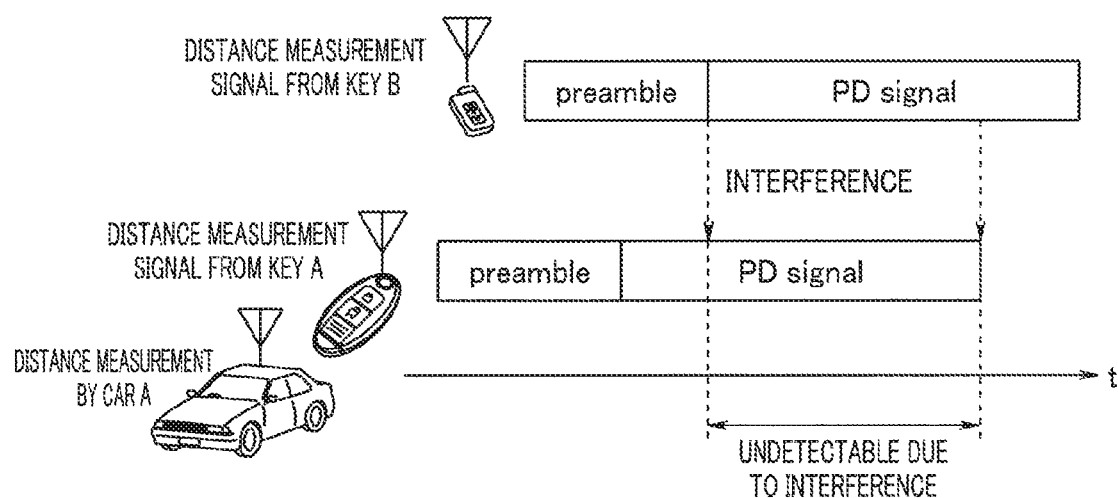
FIG. 3B is a diagram for describing a decrease in a distance measurement accuracy when an interference wave exists.

FIG. 3A illustrates how distance measurement is performed by the car B, and FIG. 3B illustrates how distance measurement is performed by the car A. The distance measurement signal in the distance measurement system includes a preamble and a phase detection (PD) signal. The preamble is an unmodulated sine wave, for example, and is used for gain adjustment. An unmodulated carrier signal is adopted as the phase detection signal, and distance measurement is performed by detecting a phase of the phase detection signal.

Although distance measurement using only one frequency is described for simplicity, the same applies to a distance measurement using two frequencies. When a speed of an electric wave (a light speed) is represented by c, a distance D for which the electric wave travels in a time period t is D=tc, and a time period t required to propagate the electric wave for the distance D is t=D/c. When each of the angular frequencies used for distance measurement is represented by $\omega$, a phase $\Delta\theta$ in which a sine wave sin $\omega$t travels in t seconds is $\omega$t. Therefore, an equation (1) is derived:

$$\Delta\theta = \omega D/c = 2\pi f \cdot D/c \quad (1)$$

When only a sine wave sin $\omega$t transmitted from the key B is received in a receiver in the car B, a distance D is found by an equation (2) using a phase $\Delta\theta$ found from a reception signal:

$$D = \Delta\theta c/2\pi f \quad (2)$$

A phase detection signal from the key A is represented by $A_A \sin(\omega t + \theta_A)$ using an amplitude $A_A$, and a phase detection signal from the key B is represented by $A_B \sin(\omega t + \theta_B)$ using an amplitude $A_B$. The car A and the car B can respectively find accurate distances from the equation (2) using phases $\theta_A$ and $\theta_B$ obtained from reception signals.

However, a signal received by the car B is a signal $y_B$ obtained by adding respective signals from the key B and the key A, and is expressed by equations (3) to (5):

$$y_B = A_A \sin(\omega t + \theta_A) + A_B \sin(\omega t + \theta_B) = A \sin(\omega t + \phi) \quad (3)$$

$$A = \{A_A^2 + A_B^2 + 2A_A A_B \cos(\theta_A - \theta_B)\}^{1/2} \quad (4)$$

$$\psi = \tan^{-1}\{(A_A \sin \theta_A + A_B \sin \theta_B)/(A_A \cos \theta_A + A_B \cos \theta_B)\} \quad (5)$$

In other words, a phase detected in the car B is $\phi$ in the equation (5), and clearly differs from the phase $\theta_B$ from the key B.

It is assumed that in the car B, the distance measurement signal from the key A is received immediately after (almost at the same time that) the distance measurement signal from the key B is received. As illustrated in FIG. 3A, the car B cannot detect a correct phase because the phase detection signal from the key A becomes an inference wave in a period during which the two phase detection signals are simultaneously received. Similarly, as illustrated in FIG. 3B, the car A cannot detect a correct phase because the phase detection signal from the key B becomes an interference wave in a period during which the two phase detection signals are simultaneously received.

Note that in a frequency band in which simultaneous transmission and reception are inhibited by the Radio Law, a carrier sense may be performed before phase detection signals are transmitted. In this case, a reception level at the time of the carrier sense may be a specified value or less by attenuations such as a distance attenuation and a shield depending on a positional relationship among the car A, the car B, the key A, and the key B and the phase detection signals may simultaneously be transmitted. Therefore, even when the carrier sense is required, an interference occurs so that a correct phase cannot be detected.

In the present embodiment, between a pair of communication devices that perform distance measurement, a distance measurement signal includes ID information (identification information) for identifying its own device in addition to an unmodulated phase detection signal. It is judged whether or not an interference wave is mixed into the distance measurement signal, and a phase detection result is not adopted when the interference wave is mixed into the distance measurement signal. As a result, a distance measurement accuracy is prevented from decreasing.

(Configuration)

In FIG. 1, a first device 1 (hereinafter referred to as a device 1) and a second device 2 (hereinafter referred to as a device 2) that constitute the distance measurement system are arranged away from each other by a distance L. At least one of the device 1 and the device 2 is movable, and the distance L changes as the device moves. The devices 1 and 2 have the same configuration. Note that when the devices 1 and 2 are applied to the smart key system, one of the devices 1 and 2 is a device provided in a key, and the other device is a device provided in car A.

Each of the devices 1 and 2 is provided with a control circuit 10. The control circuit 10 includes a CPU 10, and controls each of the units in the own device. The CPU 11 controls each of the units by operating according to a program stored in a memory 12. Note that the control circuit 10 may be composed of a processor other than a CPU, or may implement some or all of functions by hardware such as an FPGA.

A reference oscillation circuit 14 generates an oscillation signal (local signal) having a predetermined frequency. The oscillation signal is fed to a transmission circuit 15, a reception circuit 16, and a modulation/demodulation circuit 18. A frequency of the oscillation signal is set to a frequency required to generate in the transmission circuit 15 a carrier having a carrier frequency used for distance measurement.

The transmission circuit 15 can be composed of an orthogonal modulator, for example. The transmission circuit 15 orthogonally modulates a distance measurement signal ted from the modulation/demodulation circuit 18 and amplifies the orthogonally modulated distance measurement signal, and then feeds a transmission wave to an antenna 19. The antenna 19 can transmit the transmission wave. The antenna 19 receives the transmission wave received from the device 1 or 2 and feeds a reception signal to the reception circuit 16.

The reception circuit 16 can be composed of an orthogonal demodulator, for example. The reception circuit 16 orthogonally demodulates the reception signal, separates an in-phase component (I signal) and an orthogonal component (Q signal) of a reception wave, and outputs the reception wave to the modulation/demodulation circuit 18.

In the present embodiment, the control circuit 10 is provided with an ID generation circuit 13. The ID generation circuit 13 generates ID information for respectively identifying the own device and a device to be distance-measured (the device 2 for the device 1 or the device 1 for the device 2). Note that the respective ID information of the devices 1 and 2 may be identical to each other. For example, the ID generation circuit 13 may read out the ID information from the memory 12 when the ID information is previously stored in the memory 12. Every time distance measurement is performed, the ID information may be generated according to a random or predetermined rule. The CPU 11 feeds the ID information generated by the ID generation circuit 13 to the modulation/demodulation circuit 18, to control modulation/demodulation processing of the modulation/demodulation circuit 18.

In the present embodiment, the control circuit 10 controls the modulation/demodulation circuit 18 to transmit a signal including the ID information for identifying the device to be distance-measured in addition to a preamble and a phase detected signal as a distance measurement signal. In other words, the control circuit 10 controls for the preamble and the phase detection signal the modulation/demodulation circuit 18 such that an unmodulated carrier signal is outputted, and controls for the ID information the modulation/demodulation circuit 18 such that a modulated signal obtained by modulating a carrier signal by a predetermined modulation method using the ID information as a modulation signal is outputted.

The modulation/demodulation circuit 18 outputs to the transmission circuit 15 the unmodulated carrier signal for a transmission period of the preamble (a preamble period) and a transmission period of the phase detection signal (a phase detection signal period) and the modulated signal for a transmission period of the ID information (an ID signal period). Note that the modulation/demodulation circuit 18 may adopt any one of general modulation methods such as amplitude modulation, frequency modulation, and phase modulation.

Figure 4:
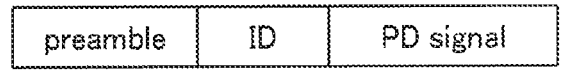
FIG. 4 is a diagram illustrating a signal format of a distance measurement signal adopted in the present embodiment.

FIG. 4 is a diagram illustrating an example of a signal format of a distance measurement signal adopted in the present embodiment. The distance measurement signal has a preamble arranged at the beginning, a modulated signal (ID) obtained by modulating ID information arranged next, and a phase detection signal (PD signal) arranged at the end. The order of the ID and the PD signal may be reversed.

Note that when receiving the reception signal, the modulation/demodulation circuit 18 outputs the carrier signal as it is to the control circuit 10 for the preamble period and the phase detection signal period and ID information obtained by demodulating the modulated signal to the control circuit 10 for the ID signal period.

The control circuit 10 adjusts a gain of the reception circuit 16, for example, depending on a level of the preamble. The control circuit 10 compares the received ID information with ID information of the own device, and detects a phase of the phase detection signal. When a phase detection result is used, distance measurement between the own device and the device to be distance-measured can be performed. Note that such distance measurement calculation can be realized when the CPU 11 executes the program stored in the memory 12.

The control circuit 10 does not adopt the phase detection result for distance measurement calculation as invalid when the ID information cannot be restored from the signal for the ID signal period or when the restored ID information and the ID information for identifying the own device do not match each other, i.e., when the ID information for identifying the own device cannot be restored from the reception signal.

Figure 5:
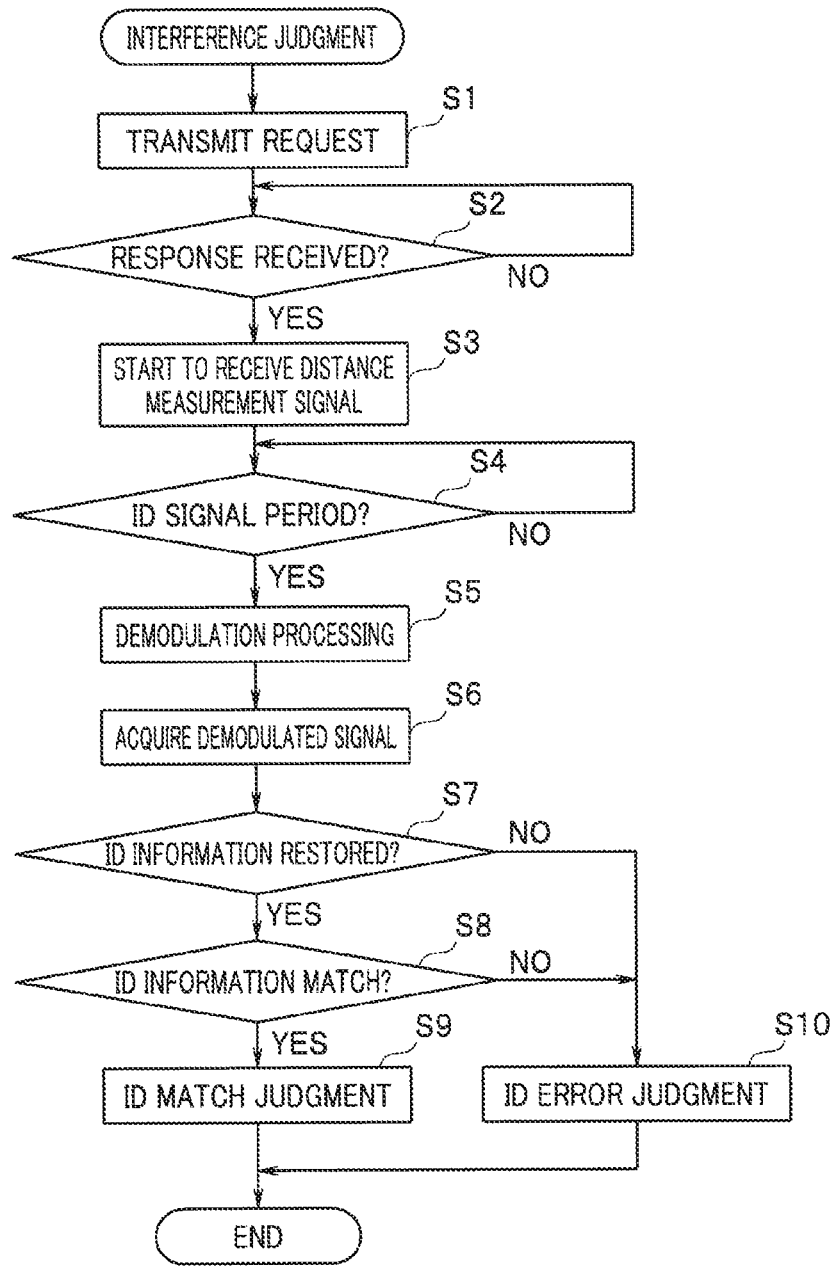
FIG. 5 is a flowchart for judging whether or not an interference wave causes interference.
Figure 6:
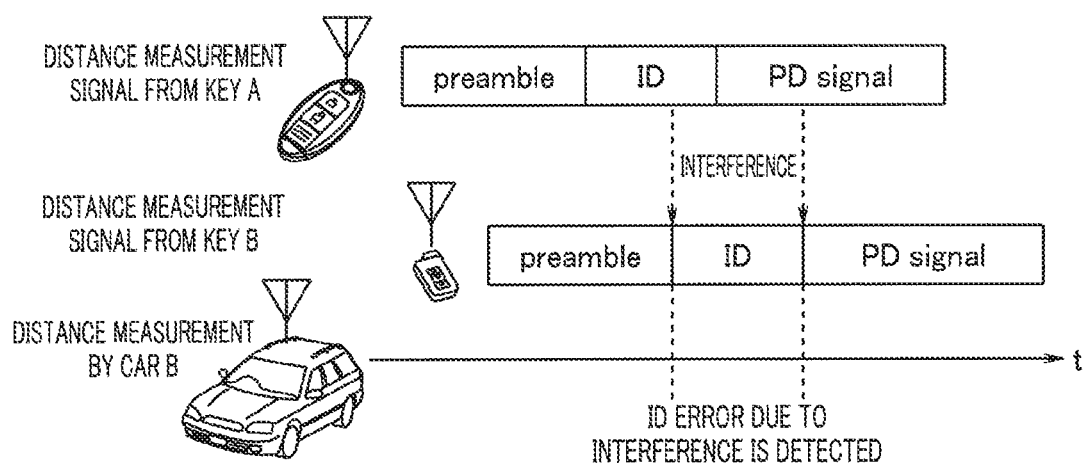
FIG. 6 is a diagram for describing how an interference wave causes interference.

An operation in the embodiment thus configured will be described below with reference to FIGS. 5 and 6. FIG. 5 is a flowchart for judging whether or not an interference wave has caused interference. FIG. 6 is a diagram for describing how an interference wave has caused interference.

A state similar to a state illustrated in FIG. 2 is assumed. Each of a car A and a car B transmits a request in a predetermined cycle (S1). Each of a key A and a key B returns a response when receiving the request, to start communication for distance measurement before being unlocked. Each of the key A and the key B transmits a distance measurement signal including ID information when performing communication for distance measurement.

Each of the car A and the car B enters into a state of waiting for reception of the response (S2). Each of the car A and the car B starts to receive the distance measurement signal when receiving the response (S3). A control circuit 10 in each of the car A and the car B adjusts a gain of the reception circuit 16 by a preamble included in the distance measurement signal. If the control circuit 10 enters an ID signal period (S4), the control circuit 10 causes the modulation/demodulation circuit 18 to demodulate a received modulated signal (S5).

If the control circuit 10 acquires the demodulation signal (S6), the control circuit 10 judges whether or not the ID information has been restored (S7). If the ID information has been restored, the control circuit 10 judges whether or not the restored ID information matches ID information of the own device stored in the memory 12 (S8). If the restored ID information matches the information of the own device, the control circuit 10 makes ID match judgment (S9).

If the control circuit 10 judges that the ID information has not been restored (S7) and judges that the restored ID information does not match the ID information of the own device (S8), the control circuit 10 makes ID error judgment (S10). The reception circuit 16 receives an unmodulated carrier in a phase detection signal period next to the ID signal period. The control circuit 10 detects a phase of a phase detection signal from an output of the reception circuit 16.

The control circuit 10 makes a phase detection result valid and uses the phase detection result for distance measurement calculation when the ID match judgment has been made (S9). The control circuit 10 makes the phase detection result invalid and does not use the phase detection result for distance measurement calculation when the ID error judgment has been made (S10). Note that in this case, the control circuit 10 may request a corresponding key to retransmit the distance measurement signal.

The control circuit 10 may find the phase of the phase detection signal after the judgments in steps S9 and S10 have been made. Phase detection processing may be started before the judgments in steps S9 and S10 are made, and the phase detection processing may be stopped or the phase detection result may be invalidated in a stage where the judgment in step S10 has been made.

FIG. 6 illustrates how the car B performs distance measurement, where a horizontal axis indicates time, illustrating reception of a distance measurement signal from the key A, reception of a distance measurement signal from the key B, and distance measurement processing by the car B. FIG. 6 illustrates an example in which not only the distance measurement signal from the key B but also the distance measurement signal from the key A to be an interference wave is received in the car B.

The example illustrated in FIG. 6 indicates that the distance measurement signal from the key B is received immediately after (almost at the same as) the distance measurement signal from the key A is received in the car B. ID information included in the distance measurement signal from the key B cannot be correctly restored because the distance measurement signal from the key A becomes an interference wave. If an intensity of the distance measurement signal from the key A is sufficiently higher than an intensity of the distance measurement signal from the key B, for example, ID information set in the key A may be detected. In this case, the control circuit 10 makes ID error judgment. If the respective intensities of the distance measurement signals from the key A and the key B are substantially the same, an error that cannot be corrected may be detected when the ID information is restored. In this case, the control circuit 10 also makes ID error judgment.

The control circuit 10 in the car B judges that the distance measurement signal from the key B has been affected by the interference wave when the ID error judgment is made, not to use a phase detection result of a phase detection signal included in the distance measurement signal for distance measurement calculation as invalid. As a result, an error can be prevented from occurring in a distance measurement calculation result due to an influence of the interference wave.

Accordingly, in the present embodiment, a distance measurement signal is transmitted with a modulated signal obtained by modulating ID information included in the distance measurement signal, and judges presence or absence of an interference wave depending on whether or not correct ID information is obtained by demodulating the modulated signal. If the interference wave exists, a phase detection result is not used for distance measurement calculation as invalid. As a result, a distance measurement calculation accuracy can be prevented from decreasing due to the interference wave.

Second Embodiment

Figure 7:
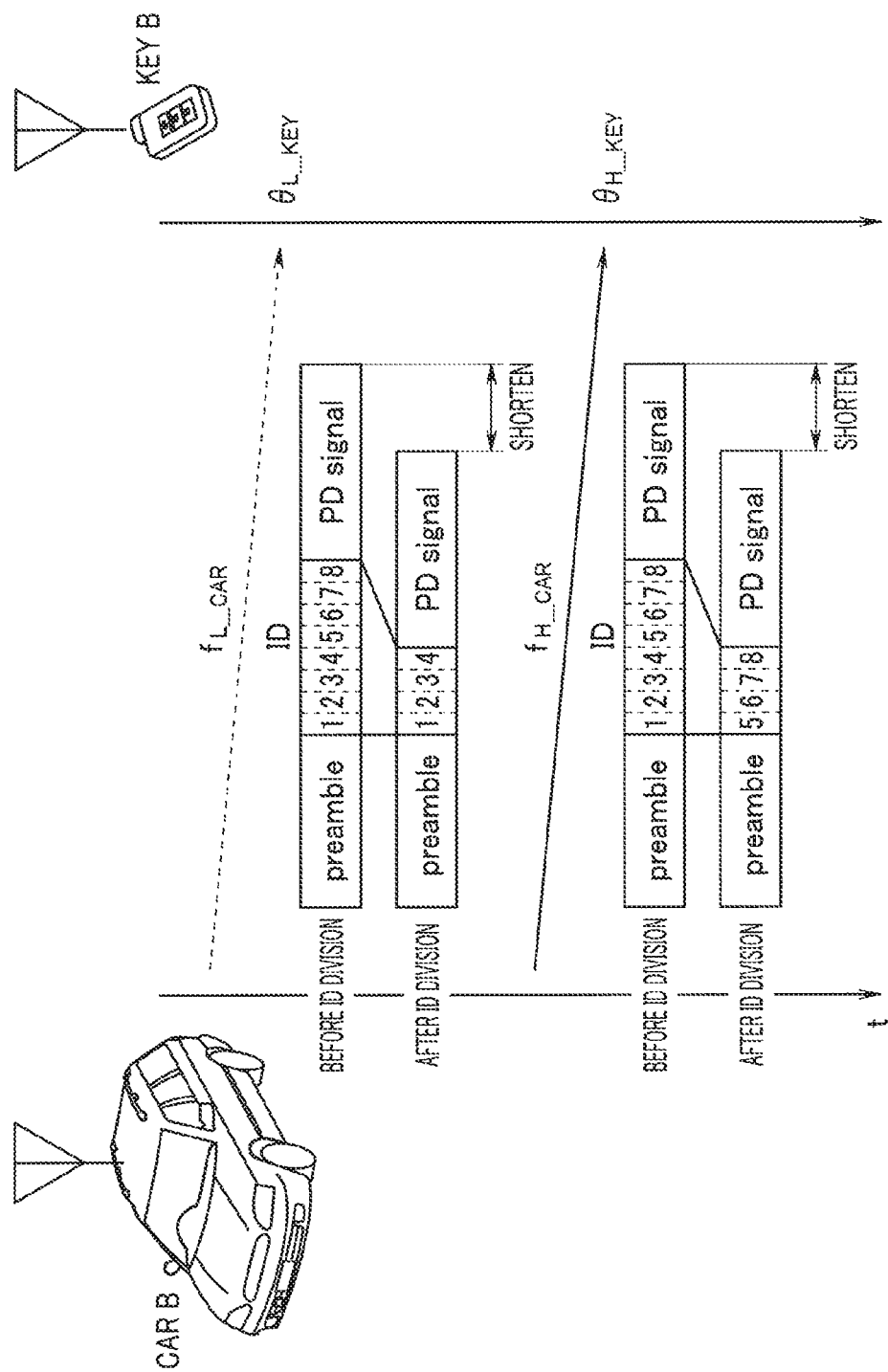
FIG. 7 is a diagram for describing a second embodiment of the present invention.

FIG. 7 is a diagram for describing a second embodiment of the present invention. A hardware configuration in the present embodiment is similar to a hardware configuration in the first embodiment. In the present embodiment, ID information is divided into plural pieces of ID information, and the plural pieces of the ID information obtained by the division (hereinafter referred to as division ID information) are separately transmitted by a distance measurement signal transmitted a plurality of times. As a result, a time period required to transmit the distance measurement signal once can be shortened, to shorten a time period required for distance measurement.

In the present embodiment, the ID information is also added for each transmission of the distance measurement signal to judge whether or not a phase detection signal is affected by an interference wave. Therefore, a time period required to communicate the distance measurement signal is lengthened by the ID information so that a time period required for distance measurement is lengthened and a response of a smart key system is delayed. When the distance measurement signal is transmitted using frequency bands used by the smart key system, i.e., a 300 MHz, 400 MHz, and 900 MHz, a frequency band of the distance measurement signal is approximately several hundred kilohertz under a restriction of e channel band so that a transmission rate of the ID information is relatively low. Therefore, a relatively long time period is required to transmit the ID information. Note that when the number of bits composing the ID information is reduced to shorten a transmission time period of the ID information, a judgment accuracy of an interference wave deteriorates. If the ID information is composed of four bits, for example, only 16 devices can be identified, which is not enough in a crowded parking lot.

A control circuit 10 divides the ID information into plural pieces of division ID information, and separately transmits the division ID information by a distance measurement signal transmitted a plurality of times. For example, in an example illustrated in FIG. 7, each of devices 1 and 2 transmits a distance measurement signal two times. The control circuit 10 performs control to divide ID information into two and transmit a distance measurement signal including each of the two pieces of the division ID information.

FIG. 7 illustrates an example of a distance measurement signal transmitted from a car B to a key B, where a vertical axis indicates time. FIG. 7 illustrates an example in which ID information is composed of eight bits. If the ID information is not divided, a distance measurement signal has a preamble arranged at the begining, a modulated signal (ID) obtained by modulating the 8-bit ID information arranged next, and has a phase detection signal (PD signal) arranged at the end. Numerals 1 to 8 in an ID signal period respectively represent bits composing the ID information transmitted by the modulated signal. In this case, the same distance measurement signal is transmitted in both first transmission and second transmission.

On the other hand, in the present embodiment, a control circuit 10 in the car B modulates only four bits in the head of the 8-bit ID information at the time of first transmission of the distance measurement signal, and transmits a modulated signal corresponding to four bits in the ID signal period. The control circuit 10 modulates only four bits in the rear of the 8-bit ID information at the time of second transmission of the distance measurement signal, and transmits a modulated signal corresponding to four bits in the ID signal period.

On the other hand, the control circuit 10 in the key B receives and demodulates four bits in the ID signal period at the time of first reception of the distance measurement signal, and acquires ID information corresponding to four bits in the head. The control circuit 10 receives and demodulates four bits at the time of second reception of the distance measurement signal, and acquires ID information corresponding to four bits in the rear. The control circuit 10 restores the original 8-bit ID information by the ID information each corresponding to four bits respectively acquired in the first reception and the second reception.

Note that the control circuit 10 may judge the ID information if possible for each reception of the distance measurement signal or may judge the ID information after receiving all distance measurement signals required to restore the ID information.

Another function is similar to a function in the first embodiment.

Although the ID information is transmitted by being divided in the present embodiment, a time period required to communicate the distance measurement signal once can be made shorter than when the ID information is transmitted without being divided, which can result in a shortened time period required for distance measurement.

When receiving ID information obtained by division, for example, the control circuit 10 restores the received ID information by demodulation processing in the ID signal period. The control circuit 10 can also judge an influence of an interference wave from a restoration result. If the ID information has not been able to be restored or if the restored ID information corresponding to four bits in the head and four bits in the head of corresponding ID information read out of the memory 12 do not match each other, for example, the control circuit 10 may make ID error judgment by judging that the received distance measurement signal is interfered with by the interference wave. In this case, communication for next distance measurement may be started without performing second reception of the distance measurement signal.

When the control circuit 10 has made match judgment for the ID information corresponding to four bits in the head by first reception of the distance measurement signal, the control circuit 10 performs second reception of the distance measurement signal, and performs processing for restoring the ID information corresponding to four bits in the rear. When the control circuit 10 judges that the ID information corresponding to four bits in the rear matches four bits in the rear of the corresponding ID information read out of the memory 12, the control circuit 10 makes ID match judgment, to use a phase detection result for distance measurement calculation. Even if the control circuit 10 makes match judgment for the ID information corresponding to four bits in the head, the control circuit 10 makes, having made mismatch judgment for the ID information corresponding to four bits in the rear, ID mismatch judgment, not to use a phase detection result for distance measurement calculation as invalid.

Figure 8:
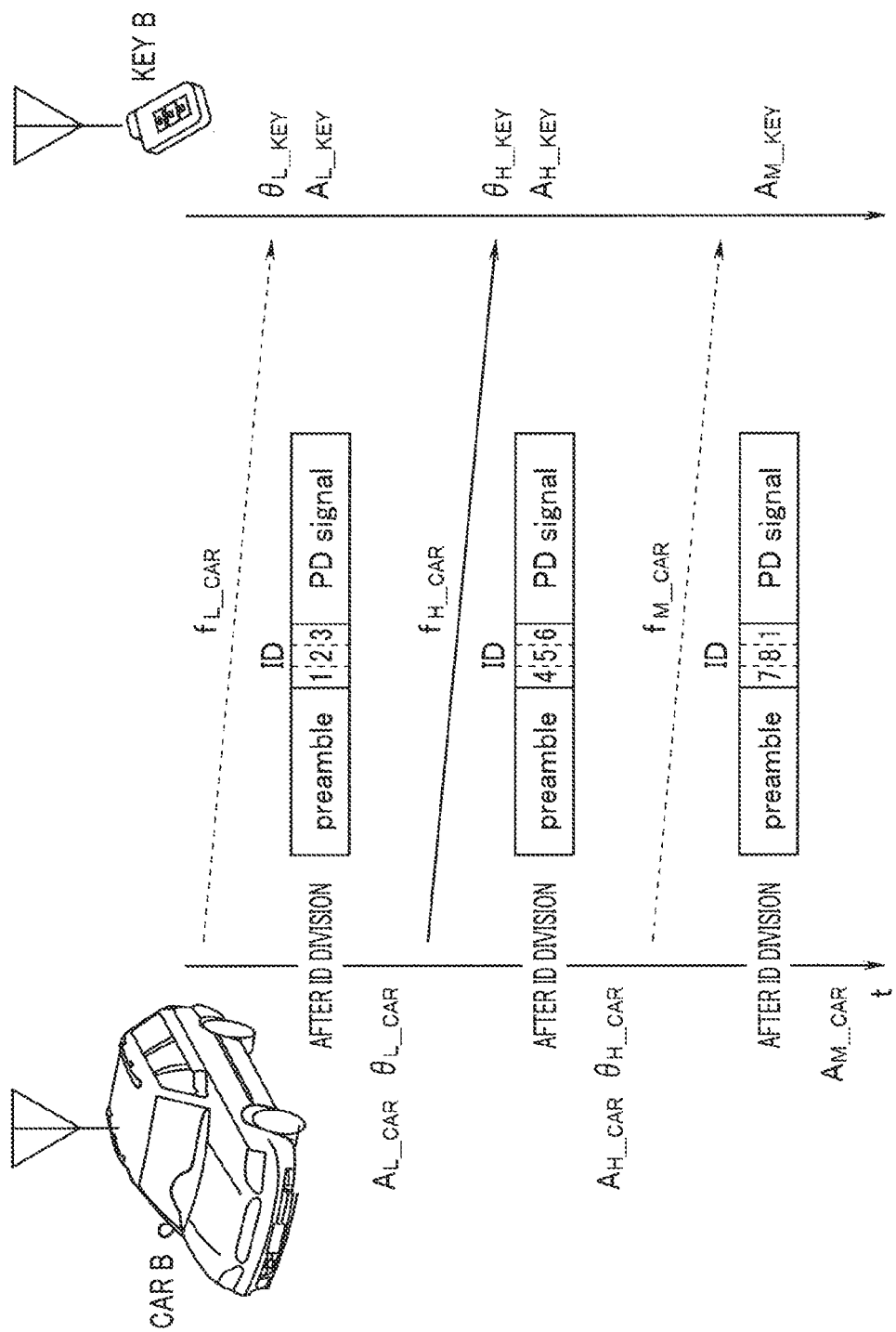
FIG. 8 is a diagram illustrating an example in which the number of times of exchanging a distance measurement signal between a car B and a key B is set to six in total in the present embodiment.

FIG. 8 is a diagram illustrating an example in which a distance measurement signal between a car B and a key B is exchanged three times in total. FIG. 8 differs from FIG. 7 in that third transmission from the car B and the key B is performed at a frequency of $f_{M\text{-}CAR} \approx f_{M\text{-}KEY} \approx f_M$. Generally, the number of times of distance measurement is increased because a distance measurement accuracy increases by using a result of performing distance measurement at many frequencies.

Since transmission is performed three times, a time period required for distance measurement is longer than when transmission is performed two times. However, the distance measurement accuracy can be improved by performing communication three times. In this case, when the number of divisions of ID information is increased, a distance measurement time period can be shortened.

In FIG. 8, 8-bit ID information is also divided into division ID information, and the division ID information is arranged in an ID signal period and transmitted. In FIG. 8, three bits in the head among eight bits are transmitted in first transmission of the distance measurement signal, fourth to sixth bits among eight bits are transmitted in second transmission of the distance measurement signal, and two bits at the end among eight bits are transmitted in third transmission of the distance measurement signal. Note that FIG. 8 illustrates an example in which one bit in the head is transmitted again at the time of the third transmission of the distance measurement signal, the bit may not be transmitted, but only two bits at the end may be transmitted as ID information.

In the present embodiment, ID information to be transmitted to judge whether or not a distance measurement signal is affected by an interference wave is divided into plural pieces of ID information, and the plural pieces of the division ID information are transmitted by being each added to the distance measurement signal. As a result, a time period required to transmit each of the distance measurement signal can be shortened, and a time period required for distance measurement can be shortened.

Note that in the present embodiment, a general modulation method such as amplitude modulation, frequency modulation, or phase modulation can be adopted as a system for modulating ID information, and the modulation method is not to be limited.

Third Embodiment

Figure 9:
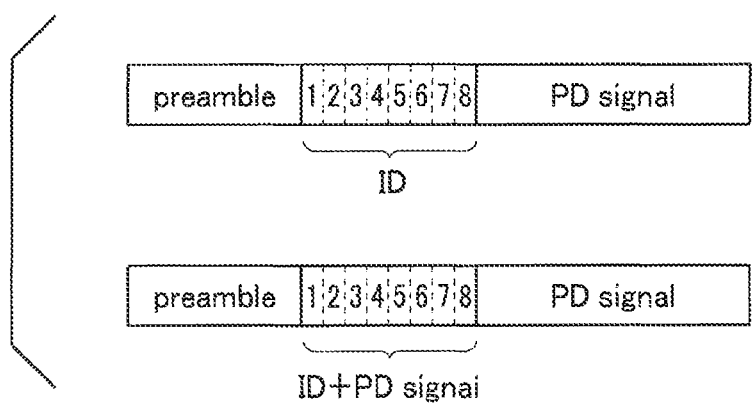
FIG. 9 is a diagram for describing a third embodiment of the present invention.
Figure 10:
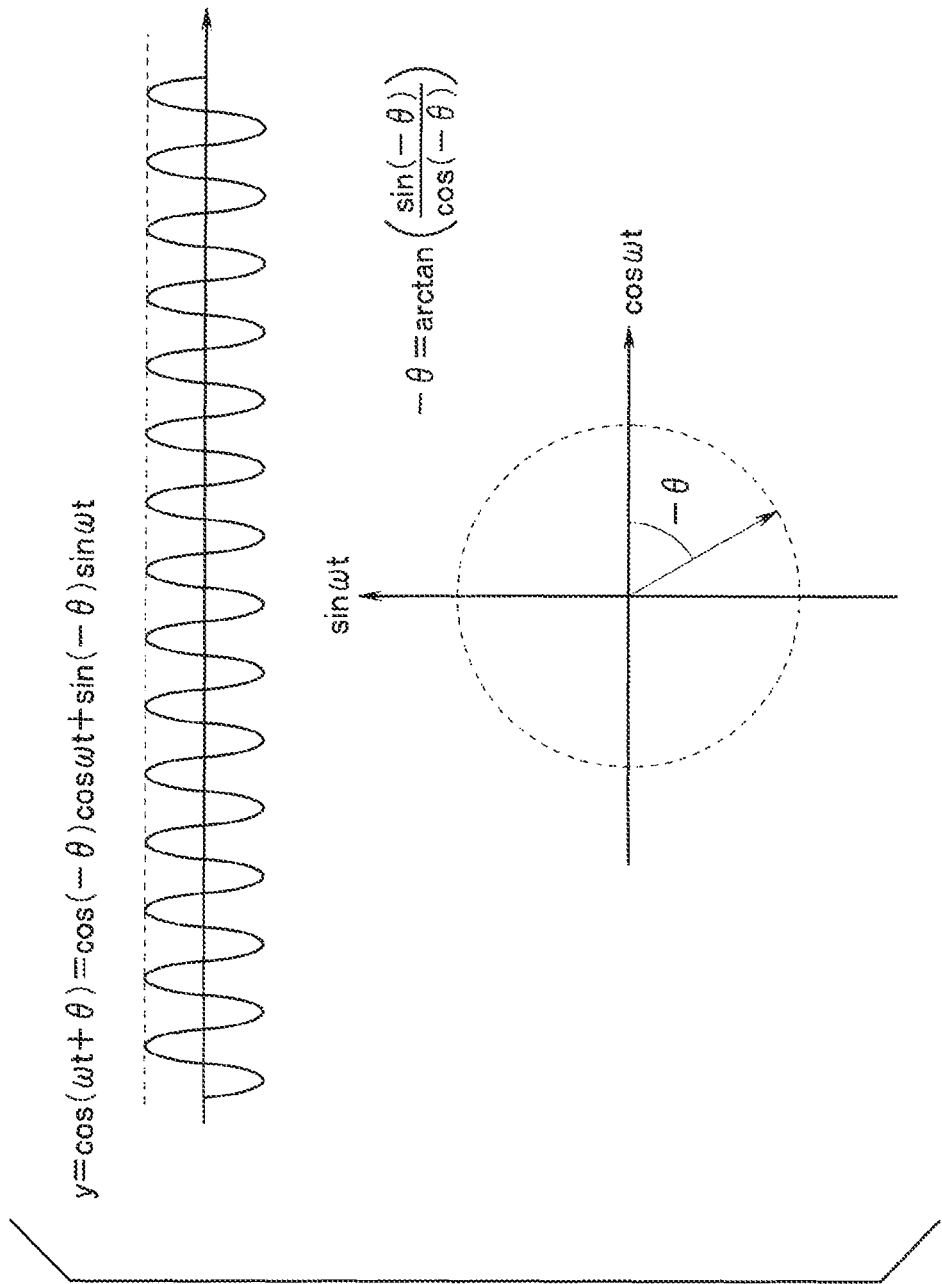
FIG. 10 is a diagram for describing the third embodiment of the present invention.
Figure 11:
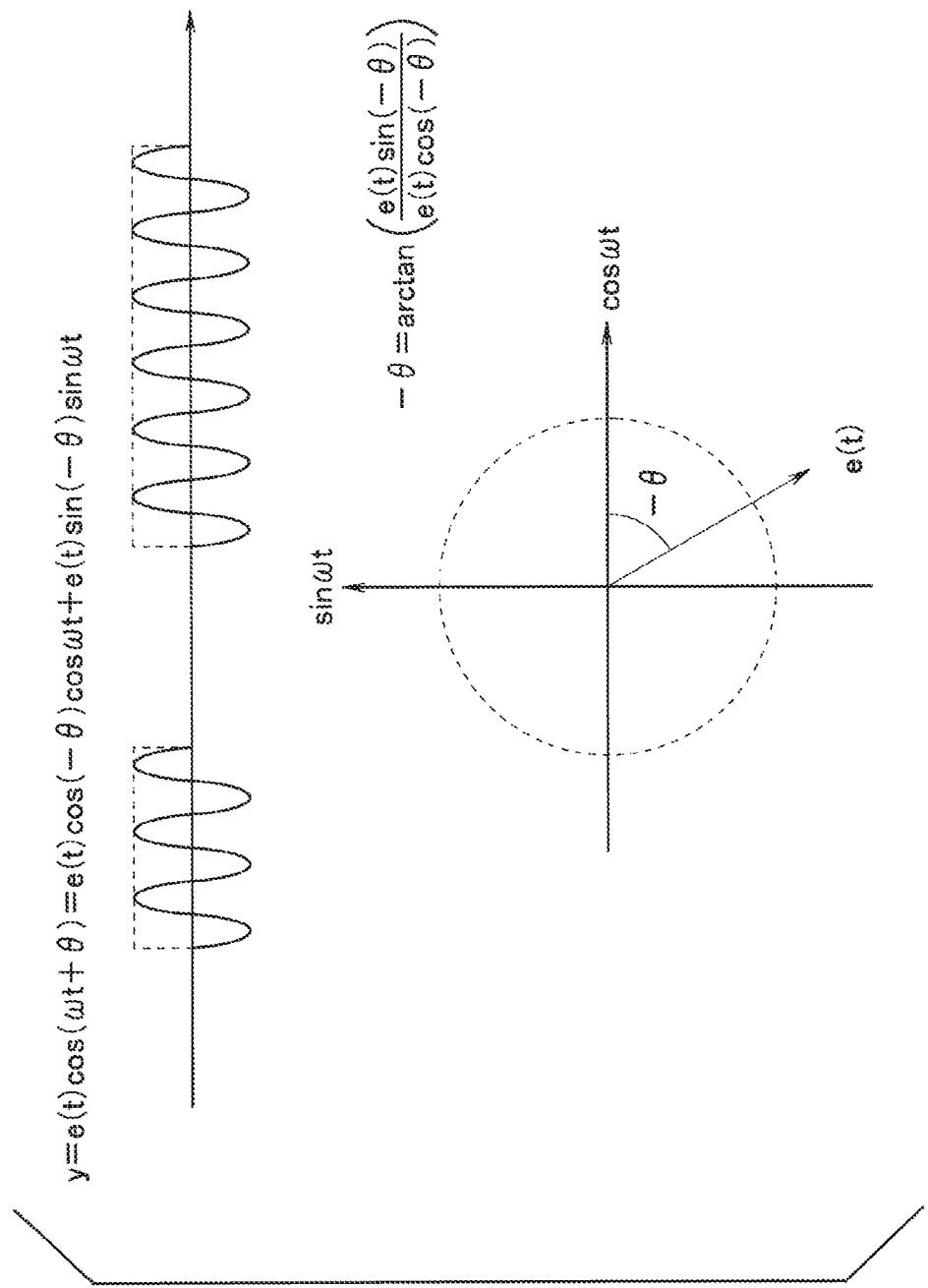
FIG. 11 is a diagram for describing the third embodiment of the present invention.

FIGS. 9 to 11 are diagrams for describing a third embodiment. A hardware configuration in the present embodiment is similar to the hardware configuration illustrated in FIG. 1. In the present embodiment, a phase detection signal period can be made longer than in the first embodiment without changing the number of bits composing ID information or a time period required for distance measurement.

A modulation/demodulation circuit 18 performs amplitude modulation or amplitude demodulation based on the ID information. The modulation/demodulation circuit 18 uses an output of a reference oscillation circuit 14 to perform amplitude modulation using the same carrier as a carrier of a phase detection signal.

In FIG. 9, the upper section represents a distance measurement signal according to the first embodiment, and the lower section represents a distance measurement signal according to the present embodiment. In the upper section illustrated in FIG. 9, the distance measurement signal has a preamble arranged at the beginning, a modulated signal (ID) obtained by modulating ID information arranged next, and a phase detection signal (PD signal) arranged at the end.

On the other hand, in the present embodiment, as illustrated in the lower section in FIG. 9, although a preamble in the head and a phase detection signal at the end are the same as in the upper section, a modulated signal (ID+PD signal) obtained by amplitude-modulating ID information (hereinafter referred to as ID information including a phase detection signal) is arranged for an ID signal period. The control circuit 10 demodulates the ID information including the phase detection signal in the ID signal period to restore the ID information, and judges an influence of an interference wave based on the restored ID information.

A control circuit 10 detects a phase of a signal portion in which a predetermined level is obtained in the ID information including the phase detection signal. In other words, the control circuit 10 detects from a reception circuit 16 the phase using an output in a part of the ID signal period and an output in a phase detection signal period.

FIGS. 10 and 11 each illustrate that phase detection similar to phase detection in the phase detection signal period can be performed using a reception signal in the ID signal period. FIG. 10 illustrates a phase detection signal, where the upper section represents a waveform and the lower section represents a phase angle.

A phase detection signal y as an unmodulated carrier signal is represented by $y=\cos(\omega t+\theta)$ using its initial phase $\theta$. Such a cosine wave signal can be deformed as follows;

$$y=\cos(\omega t+\theta)=\cos(-\theta)\cos \omega t+\sin(-\theta)\sin \omega t$$

The phase detection signal y can be represented by a vector in the lower section of FIG. 10 with cos ωt as an x-axis and sin ωt as a y-axis. A phase angle of the vector is represented by arctan $\{\sin(-\theta)/\cos(-\theta)\}$, that is, $-\theta$. The initial phase $\theta$ is a phase as a criterion for distance measurement calculation. A reference oscillation circuit 14 and a transmission circuit 15 are controlled such that the initial phase $\theta$ of the phase detection signal y does not change in a period during which a phase is detected for distance measurement.

A carrier used for modulation of the ID information is the same as the carrier of the phase detection signal. If information about the initial phase $\theta$ is held in the modulated signal after the amplitude modulation is performed on the carrier, the modulated signal can be used for phase detection used for distance measurement calculation.

FIG. 11 illustrates a modulated signal y obtained by amplitude-modulating ID information, where the upper section represents a waveform and the lower section represents a phase angle. The modulated signal y is represented by $y=e(t)\cos(\omega t+\theta)$. Note that e(t) is a level based on the ID information. Note that FIG. 11 illustrates an example in which on/off keying (OOK) is adopted as amplitude modulation. For example, e(t)=0 when a bit in the ID information is "0". The modulated signal y can be deformed as follows:

$$y=e(t)\cos(\omega t+\theta)=e(t)\cos(-\theta)\cos \omega t+e(t)\sin(-\theta)\sin \omega t$$

The above-described equation can be expressed by a vector in the lower section of FIG. 11 with cos ωt as an x-axis and sin ωt as a y-axis. A phase angle of the vector in this ease is expressed by a following equation (6):

$$\arctan \{e(t)\sin(-\theta)/e(t)\cos(-\theta)\}=-\theta \qquad (6)$$

As expressed by the equation (6), e(t) representing an amplitude in amplitude modulation is canceled because both x-axis information and y-axis information are multiplied by e(t), and phase information is stored. In an example illustrated in FIG. 11, although an amplitude of a signal in an ID signal period is zero in a period of e(t)=0, phase information is held in a period during which e(t) is not zero.

In other words, when ID information has been amplitude-modulated using the same carrier as the carrier of the phase detection signal, the modulated signal includes the same phase information as phase information of the phase detection signal. As a result, a phase detection result can be used for distance measurement calculation.

Note that although an example of an OOK signal in which e(t) is zero or one is illustrated, amplitude information is canceled, as can be seen from the foregoing equation (6), even if e(t) is a numerical value other than zero or one. Therefore, phase information is stored in amplitude modulation.

Therefore, in the present embodiment, a modulated signal obtained by amplitude-modulating ID information is transmitted as a signal in an ID signal period. Accordingly, a phase detection signal period can be equivalently lengthened. As a result, the phase detection signal period is lengthened without reducing the number of bits composing the ID information or lengthening a time period required for distance measurement to improve a phase detection accuracy, which can result in an improved distance measurement accuracy.

The present embodiment is also clearly applicable to a case where division ID information in the second embodiment is used.

Fourth Embodiment

Figure 12:
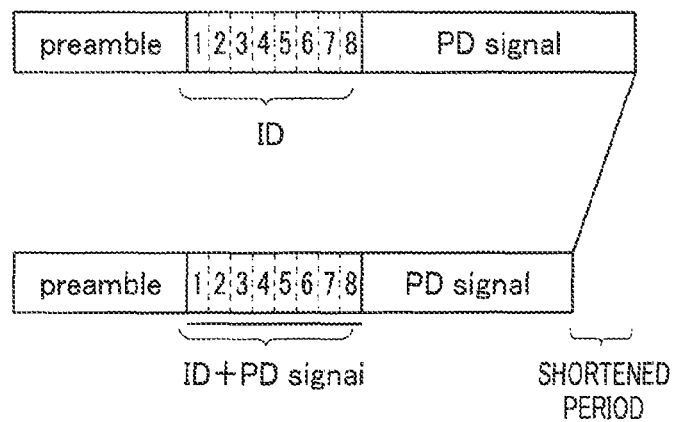
FIG. 12 is a diagram for describing a fourth embodiment of the present invention.

FIG. 12 is a diagram for describing a fourth embodiment of the present invention. A hardware configuration in the present embodiment is similar to the hardware configuration illustrated in FIG. 1. The present embodiment enables a distance measurement signal to be shortened by an idea similar to an idea in the third embodiment.

In the present embodiment, a control circuit 10 causes a modulation demodulation circuit 18 to perform amplitude modulation or amplitude demodulation based on the ID information. The modulation/demodulation circuit 18 performs amplitude modulation using the same carrier as a carrier of a phase detection signal using an output of a reference oscillation circuit 14.

The control circuit 10 recognizes whether each of bits composing ID information to be transmitted is "0" or "1", and controls a transmission circuit 15, to shorten a phase detection signal period only by a period corresponding to the number of bits "1" in the ID information. If OOK modulation is adopted as a method for modulating the ID information, a modulated signal in a period during which the bits in the ID information are "1" is the same as the phase detection signal. Therefore, the modulated signal in the period during which the bits in the ID information are "1" is used as a phase detection signal. Accordingly, a distance measurement signal can be shortened by shortening the phase detection signal period without changing a time period used for phase detection.

FIG. 12 illustrates an example in this case, where the upper section represents a distance measurement signal in the first embodiment and the lower section represents a distance measurement signal in the present embodiment. In the present embodiment, a PD signal period in ID information (ID), i.e., a phase detection signal period is shortened. In this case, a phase can also be detected in the same period as the phase detection signal period (PD signal) in the upper section.

In other words, although a part of the ID signal period is used for phase detection to improve the phase detection accuracy in the third embodiment, the phase detection signal is included in a part of an ID signal period used for phase detection, to shorten the distance measurement signal and shorten a time period required for distance measurement in the present embodiment.

The control circuit 10 judges the number of bits "1" in the restored ID information when receiving the distance measurement signal, and judges a length of the phase detection signal period based on a judgment result. If 8-bit ID information is "10011100", for example, the control circuit 10 performs phase detection based on an output of a reception circuit 16 in a modulated signal period in four portions corresponding to "1", and performs phase detection by shortening the phase detection signal period illustrated in the upper section of FIG. 12 by the modulated signal period.

Therefore, in the present embodiment, the signal in the ID signal period can be used as the phase detection signal, and the time period required tier distance measurement can be shortened by shortening the phase detection signal period without decreasing a phase detection accuracy.

Note that the present embodiment is clearly applicable to a case where division ID information in the second embodiment is used.

Fifth Embodiment

Figure 13:
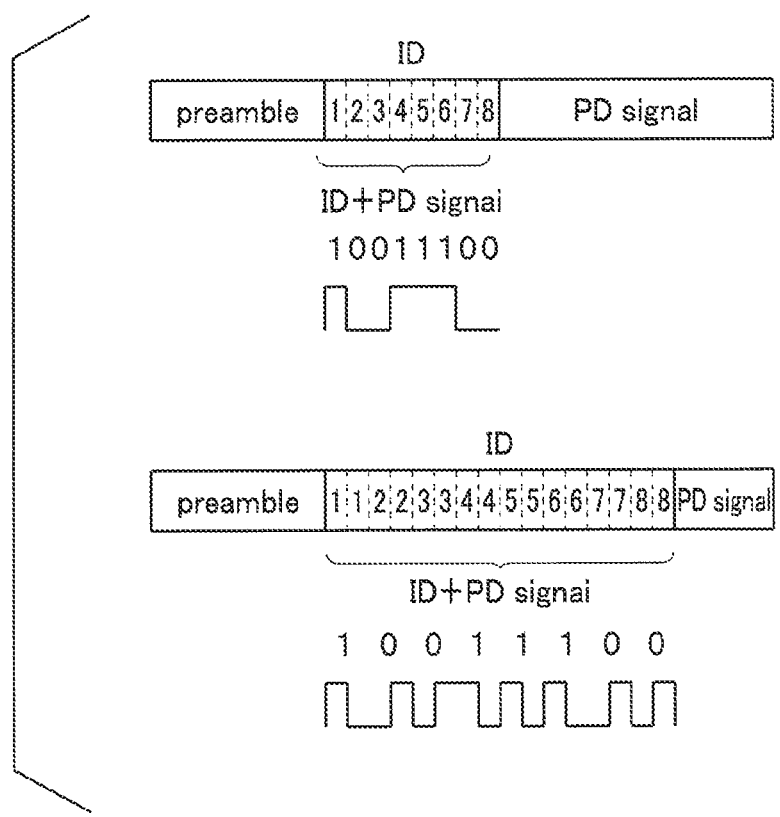
FIG. 13 is a diagram for describing a fifth embodiment of the present invention.

FIG. 13 is a diagram for describing a fifth embodiment of the present invention. A hardware configuration in the present embodiment is similar to the hardware configuration illustrated in FIG. 1. The present embodiment shortens a phase detection signal period while improving a detection accuracy of ID information according to an idea similar to an idea in the fourth embodiment.

A period that can be used for phase detection in an ID signal period is only a period during which bits in the ID information are "1". If all bits composing the ID information are "0", for example, the phase detection signal period cannot be shortened. In other words, in the fourth embodiment, the phase detection signal period varies depending on the ID information. In the present embodiment, the control circuit 10 causes a modulation/demodulation circuit 18 to perform amplitude modulation (e.g., OOK modulation) using a Manchester code.

In the Manchester code, "0" is represented by "01", and "1" is represented by "10", for example. When the Manchester code is adopted, a detection accuracy can be improved by reducing a transmission rate of the ID information. In contrast, the ID signal period is doubled. However, when the Manchester code is adopted, the number of bits "1" and the number of bits "0" are the same so that a half of the ID signal period can be used as the phase detection signal period. As a result, the detection accuracy of the ID information can be improved while a distance measurement signal is inhibited from being lengthened.

FIG. 13 illustrates an example in this case, where the upper section represents a distance measurement signal in the third embodiment and the lower section represents the distance measurement signal m the present embodiment. In an example in the upper section, 8-bit ID information is "10011100".

On the other hand, in the present embodiment, the Manchester code is adopted in the ID signal period while the phase detection signal period is shortened by a PD signal period in ID information (ID+PD signal). In other words, in the lower section, 8-bit ID information "10011100" is "1001011010100101". Both the number of bits "0" and the number of bits "1" are each eight, and phase detection can be performed in the ID signal period corresponding to eight bits. As a result, in the example illustrated in FIG. 13, while a transmission rate of the ID information becomes low, a detection accuracy of the ID information can be improved.

Therefore, in the present embodiment, the ID information is subjected to Manchester encoding, and is then amplitude-modulated so that the detection accuracy of the ID information can be improved while the distance measurement signal is inhibited from being lengthened.

(Modification)

Figure 14:
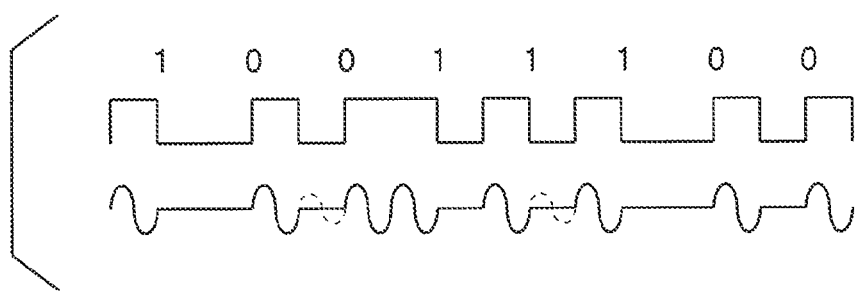
FIG. 14 is an explanatory diagram illustrating a modification.

FIG. 14 is an explanatory diagram illustrating a modification. A hardware configuration in the present modification is similar to the hardware configuration illustrated in FIG. 1.

In the present modification, a magnitude of an interference wave is more accurately detected by adopting a Manchester code and OOK modulation for ID information, for example. In each of the above-described embodiments, an influence of an interference wave is judged depending on whether or not received ID information matches ID information of its own device. However, if the magnitude of the interference wave is relatively small, the received ID information may match the ID information of the own device even if the interference wave exists. In the present modification, if the ID information is subjected to OOK modulation and transmitted, a level of the interference wave is estimated by a level of a reception signal in a "0" period.

Accordingly, in the present modification, the Manchester code may be adopted for the ID information such that the "0" period is always included in an ID signal period.

The control circuit 10 finds a signal level in the "0" period included in the ID signal period from an output of a reception circuit 16. The signal level in the "0" period can conceivably be a signal level of the interference wave. The control circuit 10 estimates the level of the interference wave by comparing the signal level with a threshold value used to judge whether a bit in the ID information is "0" or "1" in a modulation/demodulation circuit 18. For example, the level of the interference wave is set to be smaller than the level of judgment on whether the bit in the ID information is "0" or "1".

In FIG. 14, the upper section indicates a signal by a Manchester code corresponding to 8-bit ID information "10011100", and the lower section indicates by a solid line a modulated signal obtained by subjecting the Manchester code in the upper section to OOK modulation. A broken line in the lower section indicates an interference wave. The control circuit 10 judges, when the estimated level of the interference wave is larger than a predetermined threshold value, that a phase detection signal is affected by an interference wave at a relatively high level. In this case, even when the control circuit 10 makes match judgment for the ID information, the control circuit 10 may not use a phase detection result for distance measurement calculation as invalid.

Note that even when the Manchester code is not adopted, if the ID signal period includes a "0" period by OOK modulation, an influence of the interference wave can be estimated by level judgment in the "0" period.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A distance measurement system for transmitting and receiving at least one distance measurement signal including a phase detection signal between first and second devices and calculating a distance between the devices based on a phase detection result of the received phase detection signal, the distance measurement system comprising:
    a modulation circuit configured to generate the distance measurement signal including a modulated signal obtained by modulating an identification signal and the phase detection signal;

a transmission circuit configured to transmit the distance measurement signal;

a reception circuit configured to receive the distance measurement signal;

a demodulation circuit configured to demodulate the modulated signal in the received distance measurement signal; and a control circuit configured to judge a restored state of the identification signal obtained from a demodulation result of the demodulation circuit.

2. The distance measurement system according to claim 1, wherein the control circuit judges an influence of an interference wave on the phase detection result based on the restored state.

3. The distance measurement system according to claim 1, wherein the modulation circuit generates two or more of the distance measurement signals respectively including a plurality of identification signals obtained by dividing the identification signal, and the control circuit judges an influence of the interference wave from a demodulation result of at least one of the distance measurement signals.

4. The distance measurement system according to claim 1, wherein the control circuit does not use the phase detection result for calculating the distance between the devices when the control circuit cannot restore the identification signal.

5. The distance measurement system according to claim 1, wherein the transmission circuit and the reception circuit transmit and receive the distance measurement signal a plurality of times to calculate the distance between the devices in the control circuit, and the modulation circuit transmits division modulated signals obtained by dividing the modulated signal with each of the division modulated signals added to the distance measurement signal transmitted a plurality of times.

6. The distance measurement system according to claim 1, wherein the modulation circuit generates a modulated signal obtained by amplitude-modulating the identification signal, and the demodulation circuit amplitude-demodulates the modulated signal.

7. The distance measurement system according to claim 6, wherein the control circuit uses a phase detection result in a partial period of the identification signal obtained from a demodulation result of the demodulation circuit for calculating a distance between the devices.

8. The distance measurement system according to claim 7, wherein the transmission circuit transmits the distance measurement signal including the phase detection signal a signal period of which is shortened in the partial period.

9. The distance measurement system according to claim 6, wherein the modulation circuit subjects the identification signal to on/off keying modulation, to generate the modulated signal.

10. The distance measurement system according to claim 6, wherein the modulation circuit subjects the identification signal to Manchester encoding, and then amplitude-modulates the identification signal, to generate the modulated signal.

11. The distance measurement system according to claim 9, wherein the control circuit estimates a level of the interference wave based on an output level of the reception circuit in a period during which the modulated signal enters a zero level.

12. A distance measurement device, comprising:

a transmission circuit configured to transmit a distance measurement signal including a phase detection signal;

a modulation circuit configured to feed to the transmission circuit a modulated signal obtained by modulating an identification signal for identifying a device and transmit the distance measurement signal including the phase detection signal and the modulated signal;

a reception circuit configured to receive a distance measurement signal transmitted from a transmission circuit in another device;

a demodulation circuit configured to demodulate a modulated signal in the distance measurement signal received by the reception circuit; and a control circuit configured to calculate a distance based on a phase detection result of a phase detection signal in the distance measurement signal received by the reception circuit while judging a restored state of an identification signal obtained from a demodulation result of the demodulation circuit.

13. The distance measurement device according to claim 12, wherein the control circuit judges an influence of an interference wave on the phase detection result based on the restored state.

14. A distance measurement method by a distance measurement system comprising a transmission circuit and a reception circuit configured to respectively transmit and receive a distance measurement signal including a phase detection signal between a pair of devices and a control circuit configured to calculate a distance between the devices based on a phase detection result of the received phase detection signal, the distance measurement method comprising:

feeding to the transmission circuit a modulated signal obtained by modulating an identification signal that can be identified between the pair of devices and transmitting the distance measurement signal including the phase detection signal and the modulated signal;

demodulating the modulated signal in the distance measurement signal received by the reception circuit; and judging a restored state of the identification signal obtained from a result of the demodulation.

15. The distance measurement method according to claim 14, further comprising judging an influence of an interference wave on the phase detection result based on the restored state.

16. The distance measurement method according to claim 12, wherein the control circuit does not use the phase detection result for calculating the distance between the devices when the control circuit cannot restore the identification signal.

17. The distance measurement method according to claim 14, wherein the phase detection result for calculating the distance between the devices is not used, when the identification signal is restored.

* * * * *